US011632682B2

(12) United States Patent
Shen

(10) Patent No.: US 11,632,682 B2
(45) Date of Patent: Apr. 18, 2023

(54) METHOD FOR MONITORING APPARATUS

(71) Applicant: TOP WIN OPTOELECTRONICS CORP., New Taipei (TW)

(72) Inventor: Yu-Tsang Shen, Taoyuan (TW)

(73) Assignee: Top Win Optoelectronics Corp., New Taipei (TW)

( * ) Notice: Subject to any disclaimer, the term of this patent is extended or adjusted under 35 U.S.C. 154(b) by 75 days.

(21) Appl. No.: 17/172,433

(22) Filed: Feb. 10, 2021

(65) Prior Publication Data

US 2021/0258807 A1    Aug. 19, 2021

(30) Foreign Application Priority Data

Feb. 19, 2020   (TW) ................................. 109105284
May 18, 2020   (TW) ................................. 109116393

(51) Int. Cl.
| | | |
|---|---|---|
| H04W 24/04 | (2009.01) | |
| H04L 41/0668 | (2022.01) | |
| H04L 41/12 | (2022.01) | |
| H04W 24/10 | (2009.01) | |
| H04W 40/12 | (2009.01) | |

(52) U.S. Cl.
CPC ......... H04W 24/04 (2013.01); H04L 41/0668 (2013.01); H04L 41/12 (2013.01); H04W 24/10 (2013.01); H04W 40/12 (2013.01)

(58) Field of Classification Search
None
See application file for complete search history.

(56) References Cited

U.S. PATENT DOCUMENTS

| 7,693,093 B2 | 4/2010 | Riedel et al. |
| 8,699,402 B2 | 4/2014 | Nakagawa et al. |

(Continued)

FOREIGN PATENT DOCUMENTS

| CN | 101459586 | 6/2009 |
| EP | 2863607 | 4/2015 |

(Continued)

OTHER PUBLICATIONS

Sudheer Kumar Battula "An Efficient Resource Monitoring Service for Fog Computing Environments"; IEEE Transactions On Services Computing, IEEE, USA, vol. 13 (Year: 2020).*

(Continued)

*Primary Examiner* — Jeffrey M Rutkowski
*Assistant Examiner* — Mehedi S Aley
(74) *Attorney, Agent, or Firm* — Fish & Richardson P.C.

(57) ABSTRACT

A method for monitoring plural apparatus includes an initialization procedure and a monitoring procedure. The initialization procedure includes determining subset(s) of secondary devices respectively for primary device(s), designating secondary device(s) as assistant device(s), establishing a network topology with respect to the primary and secondary devices, generating a set of routing parameters that corresponds to the network topology, and sending the set of routing parameters to the primary and secondary devices in order to construct a device network of the primary and secondary devices. The monitoring procedure includes receiving and transmitting working reports from the plural apparatus to a server-end device via the device network.

14 Claims, 8 Drawing Sheets

(56) References Cited

U.S. PATENT DOCUMENTS

| | | | |
|---|---|---|---|
| 9,426,223 B2 | 8/2016 | Wang et al. | |
| 9,497,661 B2 | 11/2016 | Kempf et al. | |
| 10,771,345 B1* | 9/2020 | Louca | H04L 41/082 |
| 11,223,535 B2* | 1/2022 | Parvathamvenkatas | H04L 41/0883 |
| 2011/0282945 A1 | 11/2011 | Thyni et al. | |
| 2016/0164923 A1 | 6/2016 | Dawes | |
| 2019/0036873 A1* | 1/2019 | Nolan | H04L 61/30 |
| 2019/0165964 A1 | 5/2019 | Bartier et al. | |
| 2019/0253243 A1 | 8/2019 | Zimmerman et al. | |

FOREIGN PATENT DOCUMENTS

| | | |
|---|---|---|
| EP | 2908464 | 8/2015 |
| EP | 3425994 | 1/2019 |
| JP | 2006-237854 | 9/2006 |
| JP | 2007-243794 | 9/2007 |
| JP | 2008-519489 | 6/2008 |
| JP | 2014-175747 | 9/2014 |
| JP | 5971488 | 8/2016 |
| KR | 10-1723453 | 4/2017 |
| RU | 2694022 | 7/2019 |
| TW | 201532415 | 8/2015 |
| WO | WO 2010090562 | 8/2010 |

OTHER PUBLICATIONS

Extended European Search Report in European Appln. No. 21155995.0, dated Jun. 30, 2021, 12 pages.
Office Action in Australian Appln. No. 2021-200805, dated May 17, 2022, 2 pages.
Office Action in Australian Appln. No. 2021-200805, dated Sep. 24, 2021, 3 pages.
Office Action in Japanese Appln. No. 2021-019185, dated Aug. 9, 2022, 10 pages (with English translation).
Search Report in Japanese Appln. No. 2021-019185, dated Jul. 20, 2022, 86 pages (with English translation).

* cited by examiner

METHOD FOR MONITORING APPARATUS

CROSS-REFERENCE TO RELATED APPLICATION

This application claims priority of Taiwanese Invention Patent Application No. 109105284, filed on Feb. 19, 2020 and of Taiwanese Invention Patent Application No. 109116393, filed on May 18, 2020.

FIELD

The disclosure relates to a method for monitoring apparatus, and more particularly to a method for monitoring apparatus by utilizing networked wireless devices.

BACKGROUND

A conventional method for monitoring a plurality of apparatus utilizes a large number of wireless devices that are deployed at different locations and that are networked according to a self-established network topology which is decided by the wireless devices based on signal strength measurements. However, said network topology that is established by the wireless devices without supervision is not customized to user's needs, and therefore increases difficulty and cost for the user to maintain the network of the wireless devices in order to monitor the apparatus.

SUMMARY

Therefore, an object of the disclosure is to provide a method for monitoring apparatus that can alleviate at least one of the drawbacks of the prior art.

According to one aspect of the disclosure, the method for monitoring plural apparatus is to be implemented by a system which includes a server-end device, an administration-end device that is in communication with the server-end device, at least one primary device that is adapted to communicate with the server-end device, and plural secondary devices that are adapted to communicate with the at least one primary device and that are respectively connected with the plural apparatus. The at least one primary device and the plural secondary devices are each a wireless device having a device identifier. The method comprises steps of: A) by the server-end device after receiving a connection request from the administration-end device, establishing at least one primary wireless communication link respectively between the server-end device and the at least one primary device; B) by the administration-end device, for each of the at least one primary device, determining subset information which indicates a subset of the plural secondary devices that includes at least one secondary device which is to communicate with the server-end device through the primary device, wherein the primary device serves as a dominating device for the at least one secondary device, and each of the at least one secondary device serves as a subject device for the primary device; C) by each of the at least one primary device according to the subset information determined by the administration-end device, establishing at least one first temporary wireless communication link respectively between the primary device and the at least one subject device of the primary device; D) by the server-end device in response to receiving an assistant-setting request from the administration-end device, designating at least one of the plural secondary devices as at least one assistant device based on the assistant-setting request; E) by the server-end device after step D), establishing a network topology with respect to the at least one primary device and the plural secondary devices, wherein each of the plural secondary devices serves as one of: one of the at least one assistant device, a tail device that is to be directly linked to one of the at least one assistant device, and a branch device that is to be directly linked to the dominating device of the secondary device; F) by the server-end device, generating and storing a set of routing parameters that corresponds to the network topology thus established and that specifies plural transmission routes respectively related to the plural secondary devices, wherein each of the transmission routes is between the respective one of the secondary devices and the dominating device of the respective one of the secondary devices; G) by the server-end device, sending the set of routing parameters thus generated to the at least one primary device and to the plural secondary devices, in order to construct, based on the set of routing parameters, a device network composed of the at least one primary device and the plural secondary devices in accordance with the network topology thus established; and H) by each of the plural secondary device after step G), receiving a working report from the apparatus that is connected with the secondary device, and transmitting the working report to the dominating device of the secondary device along the transmission route that corresponds to the secondary device, in order for the dominating device to forward the working report to the server-end device, wherein the working report indicates an apparatus identifier of the apparatus and a working state of the apparatus.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
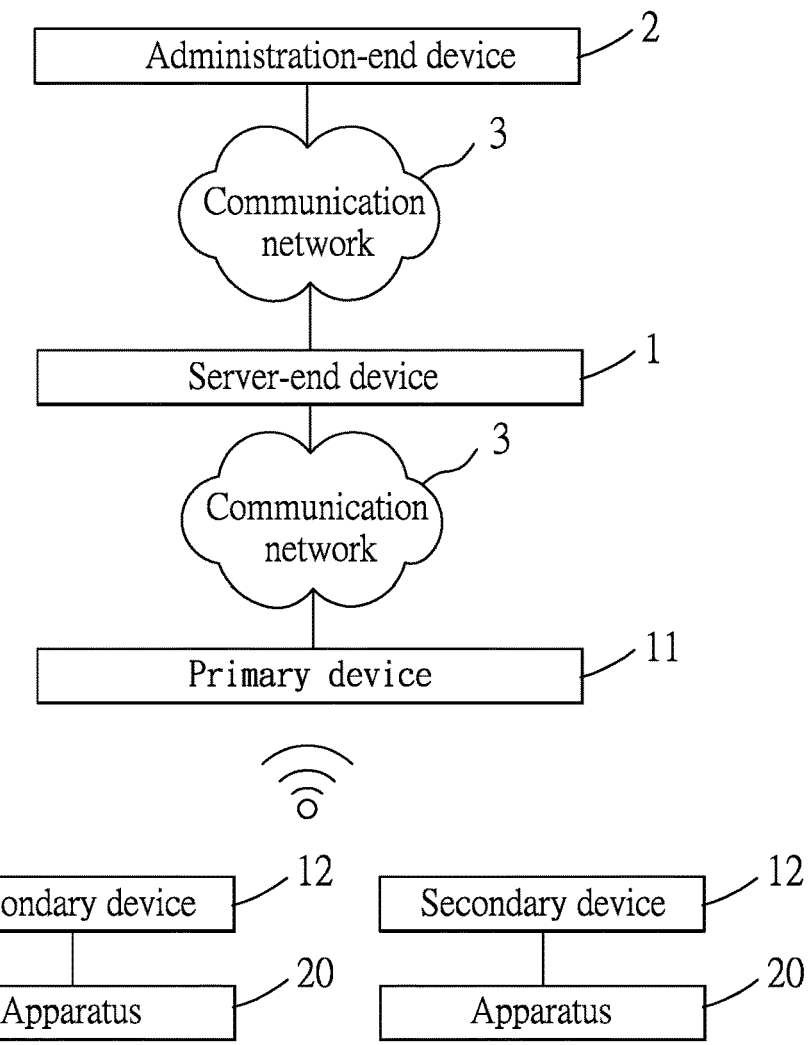
FIG. 1 is a schematic diagram that exemplarily illustrates a system for monitoring apparatus according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a block diagram that exemplarily illustrates a system for monitoring plural apparatus 20 according to an embodiment of the disclosure. The apparatus 20 are each an electronic device that is configured to output information of its working state as a working report and that has a unique apparatus identifier. According to some embodiments, each apparatus 20 may be, for example, a camera, a smart battery, a smart lamppost, a smart vending machine, a smart door lock or the like.

The system includes a server-end device 1, an administration-end device 2 and a plurality of wireless devices including at least one primary device 11 and plural secondary devices 12. Although only one primary device 11 and two secondary devices 12 are illustrated in FIG. 1, the disclosure is not limited thereto. That is, the system may include more than one primary device 11 and more than two secondary devices 12.

According to an embodiment of the disclosure, the server-end device 1 may be a server that is implemented by a personal computer (PC), a cloud host or other form. The server-end device 1 is in communication with the administration-end device 2 and the at least one primary device 11 through a communication network 3 which may be, for example, the Internet. According to an embodiment of the disclosure, the administration-end device 2 may be a PC, a notebook computer or a smart phone, but the disclosure is not limited thereto.

The at least one primary device 11 and the plural secondary devices 12 are each a wireless device having a unique device identifier. The secondary devices 12 are adapted to wirelessly communicate with the at least one primary device 11. Each secondary device 12 is connected with an apparatus 20 in order to receive the working report of the apparatus 20 therefrom and to relay the working report (indicative of the working state of the apparatus 20) to the server-end device 1. According to some embodiments, each primary device 11 may also be connected with an apparatus 20 for receiving the working report from the apparatus 20. Each apparatus 20 may further be configured to receive an instruction from the administration-end device 2 and/or the server-end device 1 through the wireless device (either a secondary device 12 or a primary device 11) connected with the apparatus 20, and perform an operation corresponding to the instruction. For example, an apparatus 20 which is a smart lamppost may turn on or turn off its light in response to receiving a turn-on instruction or a turn-off instruction through the connected wireless device. According to some embodiments, the at least one primary device 11 and the plural secondary devices 12 may be implemented as wireless communication devices that are able to communicate with each other and/or with the server-end device 1 through wireless communication technologies, such as infrared (IR) communication, mobile communication, wireless local area network (WLAN), Wi-Fi, Bluetooth, Near-Field Communication (NFC), and so forth, and may be implemented to be Internet-of-things (IoT) sensors, IoT dongles, etc.

Figure 2:
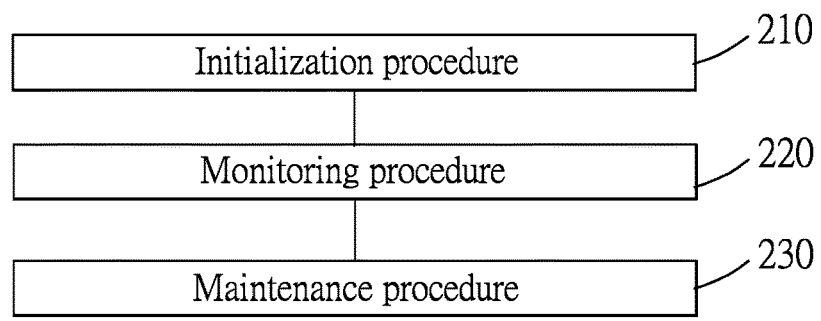
FIG. 2 is a flow chart that exemplarily illustrates a method for monitoring apparatus according to an embodiment of the disclosure.

A method that may be implemented by the system in order to monitor the apparatus 20 is illustrated in FIG. 2. As shown in FIG. 2, the method includes an initialization procedure 210 for constructing a device network of the wireless devices which include the at least one primary device 11 and the plural secondary devices 12, a monitoring procedure 220 for monitoring working states of the plural apparatus 20, and a maintenance procedure 230 for detection of communication failures occurring in the device network thus constructed and for making recovery of the device network from said failures. Details of each procedure will be described in the following.

Figure 3:
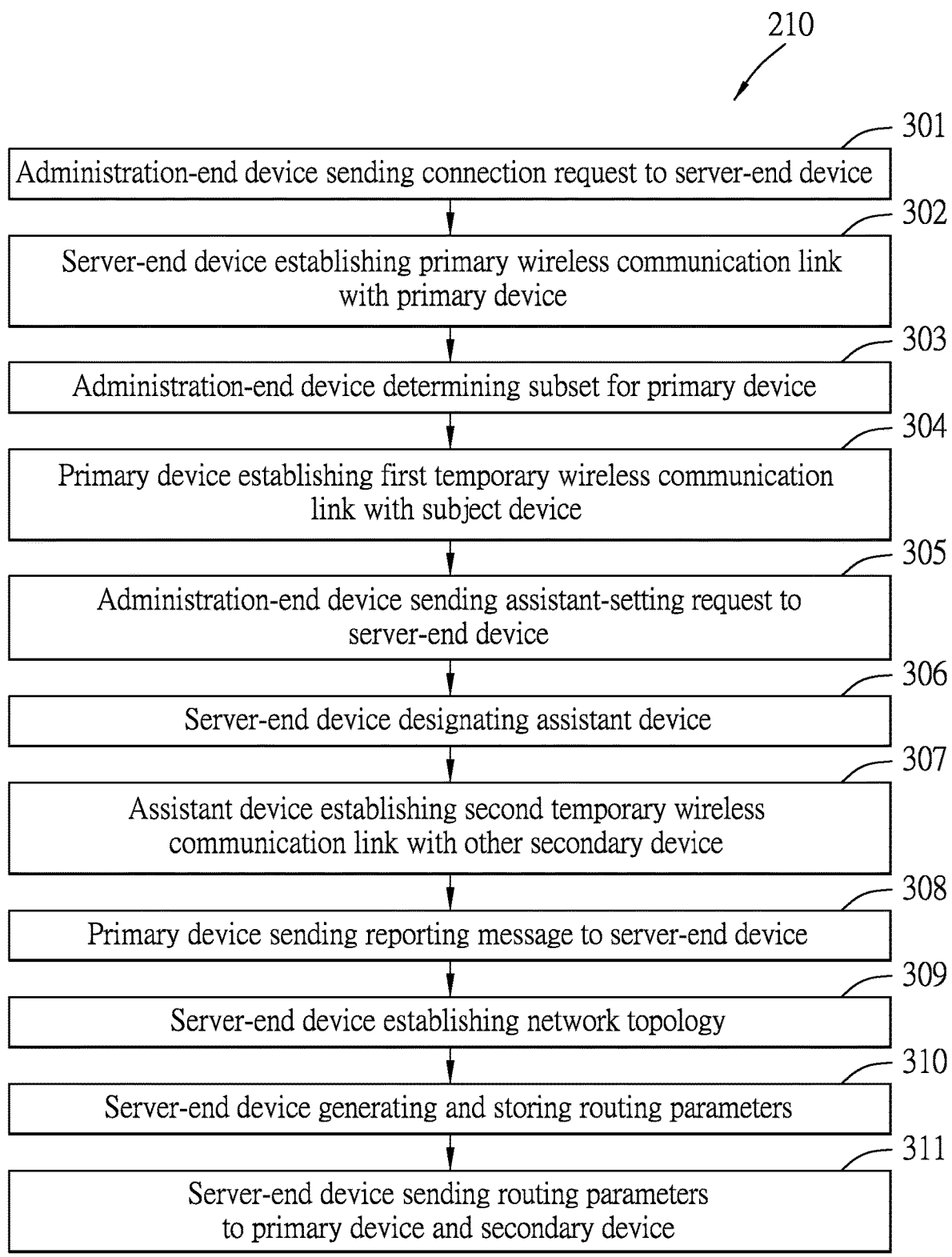
FIG. 3 is a flow chart that exemplarily illustrates an initialization procedure according to an embodiment of the disclosure.

FIG. 3 exemplarily illustrates the initialization procedure 210 according to an embodiment of the disclosure. Referring to FIG. 3, the initialization procedure 210 includes Steps 301-311.

In Step 301, the administration-end device 2 sends a connection request to the server-end device 1. According to an embodiment of the disclosure, the connection request may be sent in response to a user input to the administration-end device 2.

In Step 302, after receiving the connection request from the administration-end device 2, the server-end device 1 establishes at least one primary wireless communication link respectively between the server-end device 1 and the at least one primary device 11 (establishes, for each of the at least one primary device 11, a primary wireless communication link between the server-end device 1 and the primary device 11). According to an embodiment of the disclosure, Step 302 may include Sub-steps 3021 and 3022 as illustrated in FIG. 4.

Figure 4:
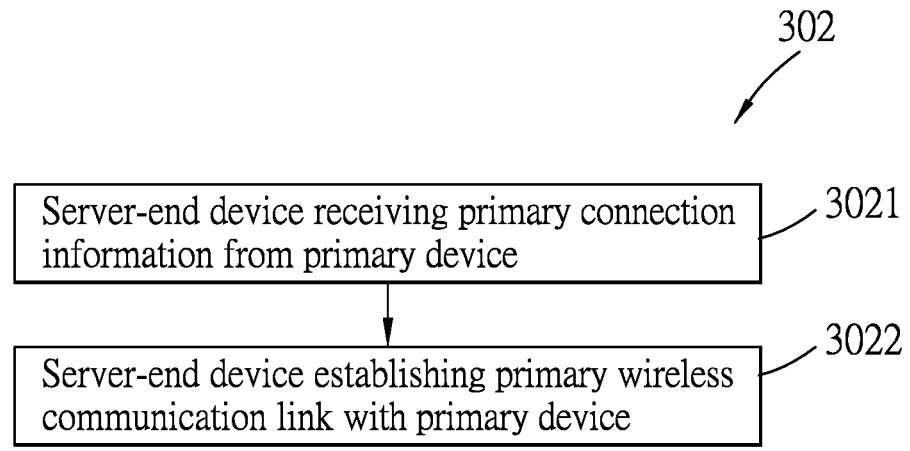
FIG. 4 is a flow chart that exemplarily illustrates sub-steps of Step 302 of FIG. 3 according to an embodiment of the disclosure.

Referring to FIG. 4, in Sub-step 3021, the server-end device 1 receives primary connection information from each primary device 11. The primary connection information indicates the device identifier of the primary device 11, a physical location of the primary device 11, and a network address of the primary device 11, which, according to an embodiment of the disclosure, may be a network path identifier that was assigned to the primary device 11 by the administration-end device 2. According to some embodiments, each primary device 11 may broadcast the primary connection information upon being powered up or in response to a user input thereto.

In Sub-step 3022, in response to receiving the connection request from the administration-end device 2, the server-end device 1 establishes the primary wireless communication link(s) respectively between the server-end device 1 and the primary device(s) 11 based on the connection request and the primary connection information received from the primary device(s) 11.

Returning back to FIG. 3, in Step 303, the administration-end device 2 divides the plural secondary devices 12 into at least one subset respectively for the at least one primary device 11. Each of the subset(s) of secondary devices 12 includes at least one secondary device 12 that is to communicate with the server-end device 1 through the respective one of the primary device(s). With respect to each of the subset(s) and the corresponding respective one of the at least one primary device 11, the primary device 11 is referred to as a dominating device for each secondary device 12 that belongs to the subset, and each secondary device 12 that belongs to the subset is referred to as a subject device for the primary device 11. Then, for each primary device 11, the administration-end device 2 determines subset information that indicates the subset of secondary devices 12 that corresponds to the primary device 11, and sends the subset information to the server-end device 1 and further to the primary device 11. According to some embodiments, the subset(s) may be determined based on distances between the at least one primary device 11 and the plural secondary devices 12 (e.g., choosing one of the at least one primary device 11 that is nearest a secondary device 12 to be the dominating device for the secondary device 12) or based on user selection, but the disclosure is not limited thereto.

In Step 304, each primary device 11 establishes, after receiving the subset information determined by the administration-end device 2, at least one first temporary wireless communication link respectively between the primary device 11 and the at least one subject device of the primary device 11 according to the subset information thus received, and measures communication quality of the at least one first temporary wireless communication link. According to an embodiment of the disclosure, Step 304 may include Sub-steps 3041-3043 as illustrated in FIG. 5.

Figure 5:
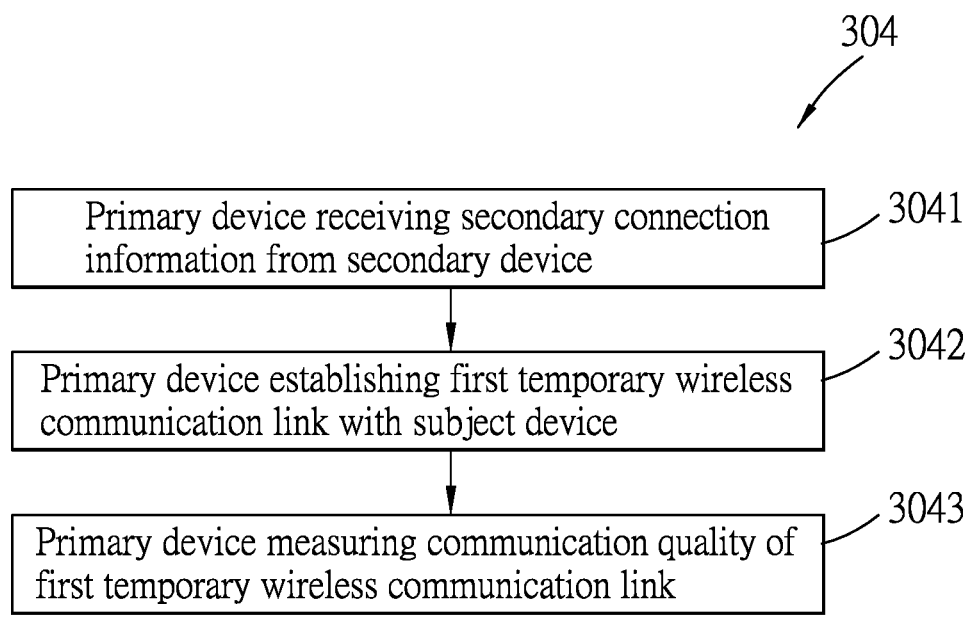
FIG. 5 is a flow chart that exemplarily illustrates sub-steps of Step 304 of FIG. 3 according to an embodiment of the disclosure.

Referring to FIG. 5, in Sub-step 3041, the primary device 11 receives, for each of the subject device(s) of the primary device 11, secondary connection information from the secondary device 12, wherein the secondary connection information indicates the device identifier of the subject device, a physical location of the subject device, a network address (e.g., a network path identifier) of the subject device, and a number of data packets that the subject device has previously sent to the primary device 11. According to some embodiments, each secondary device 12 may broadcast the secondary connection information upon being powered up or in response to a user input thereto.

In Sub-step 3042, the primary device 11 establishes, for each of the subject device (s) of the primary device 11 that is specified in the subset information which the primary device 11 has received and which was determined by the administration-end device 2, the first temporary wireless communication link between the primary device 11 and the subject device based on the secondary connection information received from the subject device.

In Sub-step 3043, the primary device 11 measures communication quality of the at least one first temporary wireless communication link that the primary device 11 has established in Sub-step 3042.

Returning back to FIG. 3, in Step 305, the administration-end device 2 sends, to the server-end device 1, an assistant-setting request that specifies at least one of the plural secondary devices 12, where each specified secondary device 12 is to serve as an assistant device that is allowed to directly communicate with its dominating device and that may gather working reports from other secondary device(s). According to an embodiment of the disclosure, the connection request may be sent in response to a user input to the administration-end device 2.

In Step 306, the server-end device 1 designates, in response to receiving the assistant-setting request from the administration-end device 2, the at least one of the plural secondary devices 12 as at least one assistant device based on the assistant-setting request. Then, the server-end device 1 sends, for each of the at least one assistant device, an estimation signal to the assistant device in order to initiate establishment of at least one second temporary wireless communication link respectively between the assistant device and at least another one of the at least one subject device of the dominating device of the assistant device (excluding the assistant device itself) (also referred to as at least one related device of the assistant device hereinafter). According to an embodiment of the disclosure, the at least one related device of an individual assistant device is the at least another one of the at least one subject device of the dominating device of the assistant device that is nearest the assistant device, but the disclosure is not limited thereto.

In Step 307, each assistant device establishes, in response to receiving the measurement signal, the at least one second temporary wireless communication link respectively between the assistant device and the at least one related device of the assistant device, measures communication quality of the at least one second temporary wireless communication link, and sends, to the dominating device of the assistant device, a link message that indicates, for each of the at least one second temporary wireless communication link, the communication quality of the second temporary wireless communication link thus measured.

In Step 308, each primary device 11 sends, to the server-end device 1, a reporting message that indicates, for each link among the at least one first temporary wireless communication link that was established by the primary device 11 and any second temporary wireless communication link that is indicated in the link message(s) the primary device 11 has received, the communication quality of the link. The reporting message further indicates, for each device among the primary device 11 and the at least one subject device of the primary device 11, the device identifier of the device and a physical location of the device.

In Step 309, after receiving the reporting message from each of the at least one primary device 11, the server-end device 1 establishes a network topology with respect to the at least one primary device 11 and the plural secondary devices 12 based on the reporting message(s). In the network topology, each of the plural secondary devices 12 serves as one of the following: an assistant device; a tail device that is directly linked to an assistant device (the tail device serves as a subject tail device for the assistant device that it is linked to, and that assistant device serves as an upstream device for the tail device) and that is indirectly linked to the dominating device of the secondary device 12 through the assistant device; (3) a branch device that is directly linked to the dominating device of the secondary device 12 (the dominating device serves as an upstream device of the branch device) and that is not linked to any assistant device. According to an embodiment of the disclosure, the network topology may be established based on communication quality information indicated in the reporting message(s). For example, if a reporting message received from an individual primary device 11 indicates that the communication quality of a first temporary wireless communication link between the primary device 11 and an individual subject device of the primary device 11 is worse than the communication quality of a second temporary wireless communication link between said subject device and an assistant device which is also a subject device of the primary device 11, then the server-end device 1 may determine that said individual subject device should be a tail device that is to communicate with said assistant device through a wireless communication link that is to be established therebetween. On the other hand, if the communication quality of said first temporary wireless communication link is better than said second temporary wireless communication link, or if no communication quality of any second temporary wireless communication link is reported in said reporting message, then the server-end device 1 may determine that said individual subject device should be a branch device that is to directly communicate with said primary device 11 through a wireless communication link that is to be established therebetween.

Figure 6:
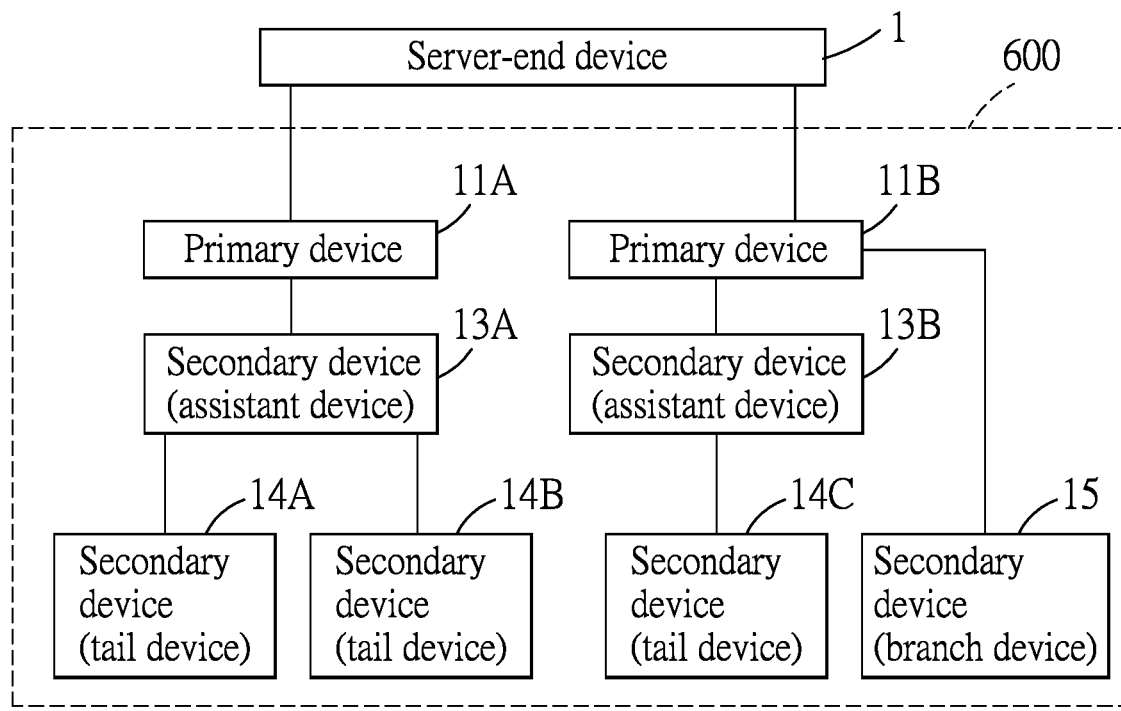
FIG. 6 is a schematic diagram that exemplarily illustrates a network topology of a plurality of wireless devices according to an embodiment of the disclosure.

FIG. 6 exemplarily illustrates a network topology 600 that may be established for a system that includes two primary devices 11A, 11B and six secondary devices 13A, 13B, 14A, 14B, 14C, 15 according to an embodiment of the disclosure. In the network topology 600, the primary device 11A is the dominating device for three secondary devices 13A, 14A, 14B (i.e., the secondary devices 13A, 14A, 14B are each a subject device of the primary device 11A), and the primary device 11B is the dominating device for the other three secondary devices 13B, 14C, 15 (i.e., the secondary devices 13B, 14C, 15 are each a subject device of the primary device 11B). There are two secondary devices 13A, 13B that serve as assistant devices and that are respectively in direct communication with their dominating devices 11A, 11B, three secondary devices 14A, 14B, 14C that serve as tail devices, and one secondary device 15 that serves as a branch device. The tail devices 14A, 14B are in indirect communication with their dominating device 11A through the assistant device 13A (the assistant device 13A is the upstream device of the tail devices 14A, 14B). The tail device 14C is in indirect communication with its dominating device 11B through the assistant device 13B (the assistant device 13B is the upstream device of the tail device 14C). The branch device 15 is in direct communication with its dominating device 11B (the primary device 11B is the upstream device of the branch devices 15). The connecting lines in FIG. 6 are each a wireless communication link for communication between the two devices at the two ends of the wireless communication link.

Returning back to FIG. 3, in Step 310, the server-end device 1 generates and stores a set of routing parameters that corresponds to the network topology established in Step 309. The set of routing parameters specifies the device identifier and the physical location of each device among the at least one primary device 11 and the plural secondary devices 12, and plural transmission routes respectively related to the plural secondary devices 12 (each of which may be an assistant device, a tail device or a branch device) by indicating plural wireless communication links that are to be maintained among the wireless devices, wherein each of the transmission routes is between a respective one of the secondary devices 12 and the dominating device for the respective one of the secondary devices 12.

For example, for the network topology 600 as shown in FIG. 6, the set of routing parameters generated therefor would indicate six wireless communication links and specify six transmission routes respectively related to the six secondary devices 13A, 13B, 14A, 14B, 14C, 15. The six wireless communication links are respectively between the primary device 11A and the secondary device 13A, the primary device 11B and the secondary device 13B, the primary device 11B and the secondary device 15, the secondary device 13A and the secondary device 14A, the secondary device 13A and the secondary device 14B, and the secondary device 13B and the secondary device 14C. The set of routing parameters specifies, for example, a transmission route related to the secondary device 14A that is between the tail device 14A and the primary device 11A and that passes through the assistant device 13A, and another transmission route related to the secondary device 15 that is between the branch device 15 and the primary device 11B and that passes through no assistant device.

In Step 311, the server-end device 1 sends the set of routing parameters thus generated to the at least one primary device 11, and to the plural secondary devices 12 respectively along the plural transmission routes, in order to construct, based on the set of routing parameters, a device network composed of the at least one primary device 11 and the plural secondary devices 12 in accordance with the network topology established in Step 309.

According to some embodiments, the first and second temporary wireless communication links are cut off after communication quality thereof is measured and reported to the server-end device 1, and the device network is constructed by the primary device(s) 11 establishing, upon receiving the set of routing parameters and based on the set of routing parameters, at least one wireless communication link each of which is between a corresponding one of the primary device(s) 11 and a corresponding one of the assistant device(s) and which exists in the network topology and perhaps also at least one wireless communication link each of which is between a corresponding one of the primary device(s) 11 and a corresponding one of at least one branch device and which exists in the network topology, and by the assistant device(s) establishing, upon receiving the set of routing parameters and based on the set of routing parameters, at least one wireless communication link that is between the assistant device(s) and at least one tail device and that exists in the network topology.

Figure 7:
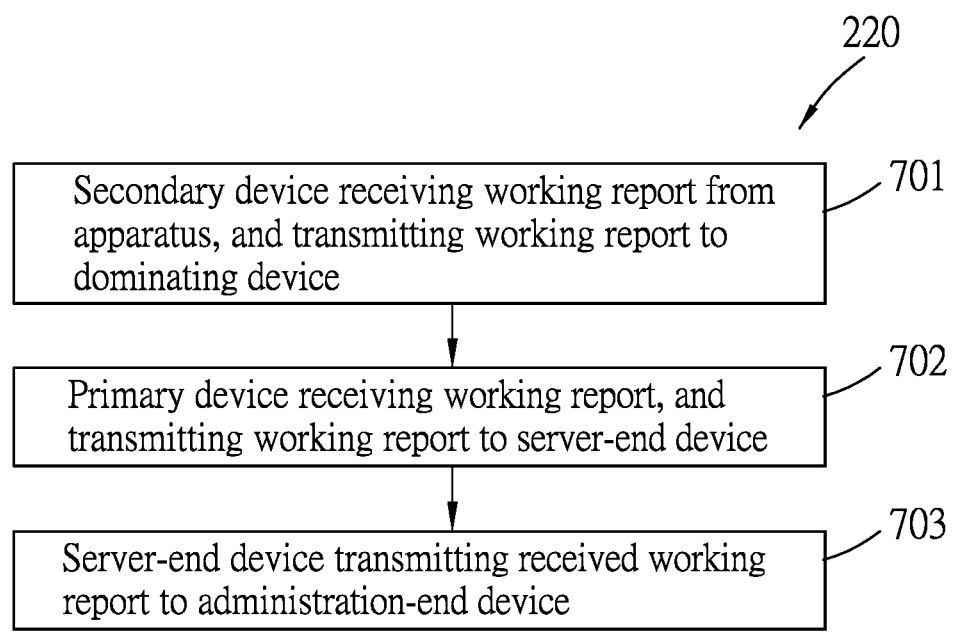
FIG. 7 is a flow chart that exemplarily illustrates a monitoring procedure according to an embodiment of the disclosure.

As shown in FIG. 2, the monitoring procedure 220 is performed after the initialization procedure 210. FIG. 7 exemplarily illustrates the monitoring procedure 220 according to an embodiment of the disclosure. Referring to FIG. 7, the monitoring procedure 220 includes Steps 701-703.

In Step 701, each secondary device 12 (may be an assistant device, a tail device or a branch device) receives a working report from the apparatus 20 that is connected with the secondary device 12, and transmits the working report to the dominating device of the secondary device 12 along the transmission route corresponding to the secondary device 12 (may be directly to the dominating device or indirectly through an assistant device), in order for the dominating device to forward the working report to the server-end device 1. The working report indicates an apparatus identifier of the apparatus 20 and a working state of the apparatus 20. According to some embodiments, the working report may further indicate a physical location (e.g., latitude and longitude coordinates) of the apparatus 20.

According to an embodiment of the disclosure, the working report from the apparatus 20 which is a smart battery may, for example, indicate the apparatus identifier of the apparatus 20 that is a unique product serial number of the smart battery, and the working state of the apparatus 20 that includes information relating to an output voltage of the smart battery, an output current of the smart battery, or whether the smart battery is recharging or discharging. According to another embodiment of the disclosure, the working report from the apparatus 20 which is a smart lamppost may, for example, indicate the apparatus identifier of the apparatus 20 that is a unique product serial number of the smart lamppost, and the working state of the apparatus 20 that includes information relating to whether a lamp of the lamppost is turned on or off. According to a further embodiment of the disclosure, the working report from the apparatus 20 which is a smart door lock may, for example, indicate the apparatus identifier of the apparatus 20 that is a unique product serial number of the smart door lock, and the working state of the apparatus 20 that includes information relating to whether the smart door lock is locked or unlocked.

In Step 702, each primary device 11 receives the working report(s) from the subject device(s) of the primary device 11, and transmits the working report(s) to the server-end device 1. In an embodiment where each of the primary device(s) 11 is also connected to an apparatus 20, the primary device 11 also receives a working report from the apparatus 20 connected thereto, and transmits the received working report to the server-end device 1.

In Step 703, the server-end device 1 transmit the working report(s) received from the at least one primary device 11 to the administration-end device 2. In this way, the working states of the plural apparatus 20 can be monitored by user(s) using the administration-end device 2.

According to an embodiment of the disclosure, each apparatus 20 may send the working report periodically (e.g., every thirty minutes), and the primary device(s) 11 and the secondary devices 12 may immediately transmit the working reports to the server-end device 1 upon receiving the working reports. According to some embodiments, each apparatus 20 may send the working report in response to receiving, from the secondary device 12 (or the primary device 11) connected thereto, a working state request that is initiated by the administration-end device 2. According to an embodiment of the disclosure, the working state request may be generated by the administration-end device 2, sent from the administration-end device 2 to the server-end device 1, sent from the server-end device 1 to the at least one primary device 11, and then sent from the at least one primary device 11 to each of the plural secondary devices 12, in order to collect working reports from the plural apparatus 20.

As shown in FIG. 2, after the monitoring procedure 220 is performed, i.e., after the system starts to monitor the plural apparatus 20 by means of the device network of the wireless devices including the primary device (s) 11 and the secondary devices 12 that has been established in the initialization procedure 210, the maintenance procedure 230 is performed.

Figure 8:
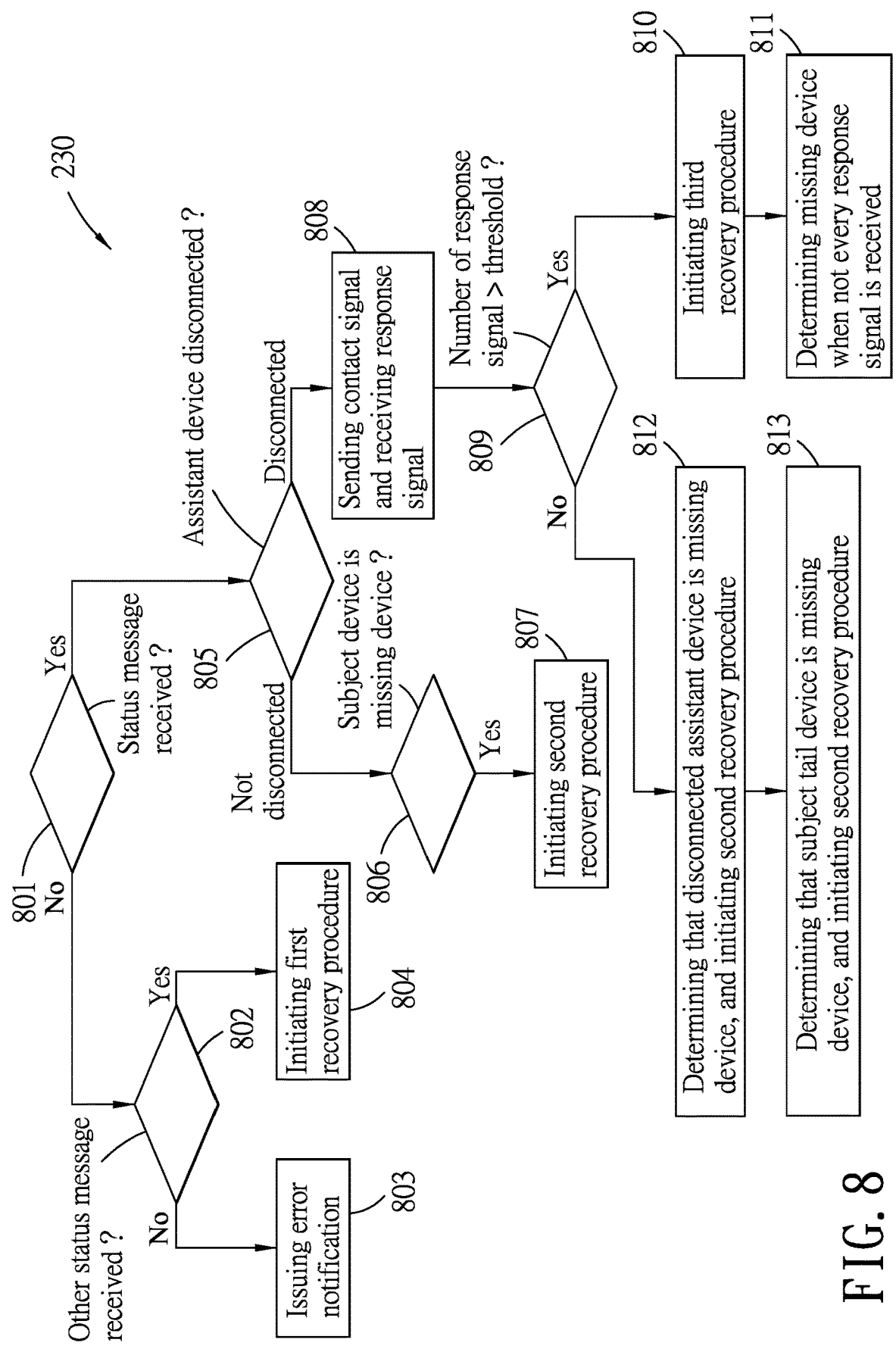
FIG. 8 is a flow chart that exemplarily illustrates a maintenance procedure according to an embodiment of the disclosure.

FIG. 8 exemplarily illustrates the maintenance procedure 230 according to an embodiment of the disclosure. Referring to FIG. 8, the maintenance procedure 230 includes Steps 801-813 that are to be performed with respect to each of the primary device (s) 11.

In Step 801, the server-end device 1 determines whether a status message is received from the primary device 11 within a predetermined time period (which may be, for example, several milliseconds, several seconds or several hours, depending on the application scenario) after a link status request is sent from the server-end device 1 to the primary device 11 demanding that the primary device 11 should reply with the status message. If so, the process goes to Step 805; otherwise, the server-end device 1 determines that the primary device 11 is a disconnected primary device, and the process goes to Step 802. The status message indicates, for each subject device of the primary device 11, information relating to whether the transmission route related to the subject device is functional, which may be determined based on, for example, whether a working report from the subject device has been received recently, or whether a reply to a testing signal that the primary device 11 has sent to the subject device has been received. According to an embodiment of the disclosure, the status message may further indicate communication quality of each wireless communication link connected to the subject device(s) of the primary device 11.

In Step 802, the server-end device 1 determines whether any other status message is received from any other primary device 11 within the predetermined time period. If so (which means that the system includes plural primary devices 11), the process goes to Step 804; otherwise, the process goes to Step 803.

In Step 803, the server-end device 1 issues, to the administration-end device 2, an error notification indicating that no primary device 11 is available, in order for user(s) of the administration-end device 2 to arrange timely repair.

Figure 9:
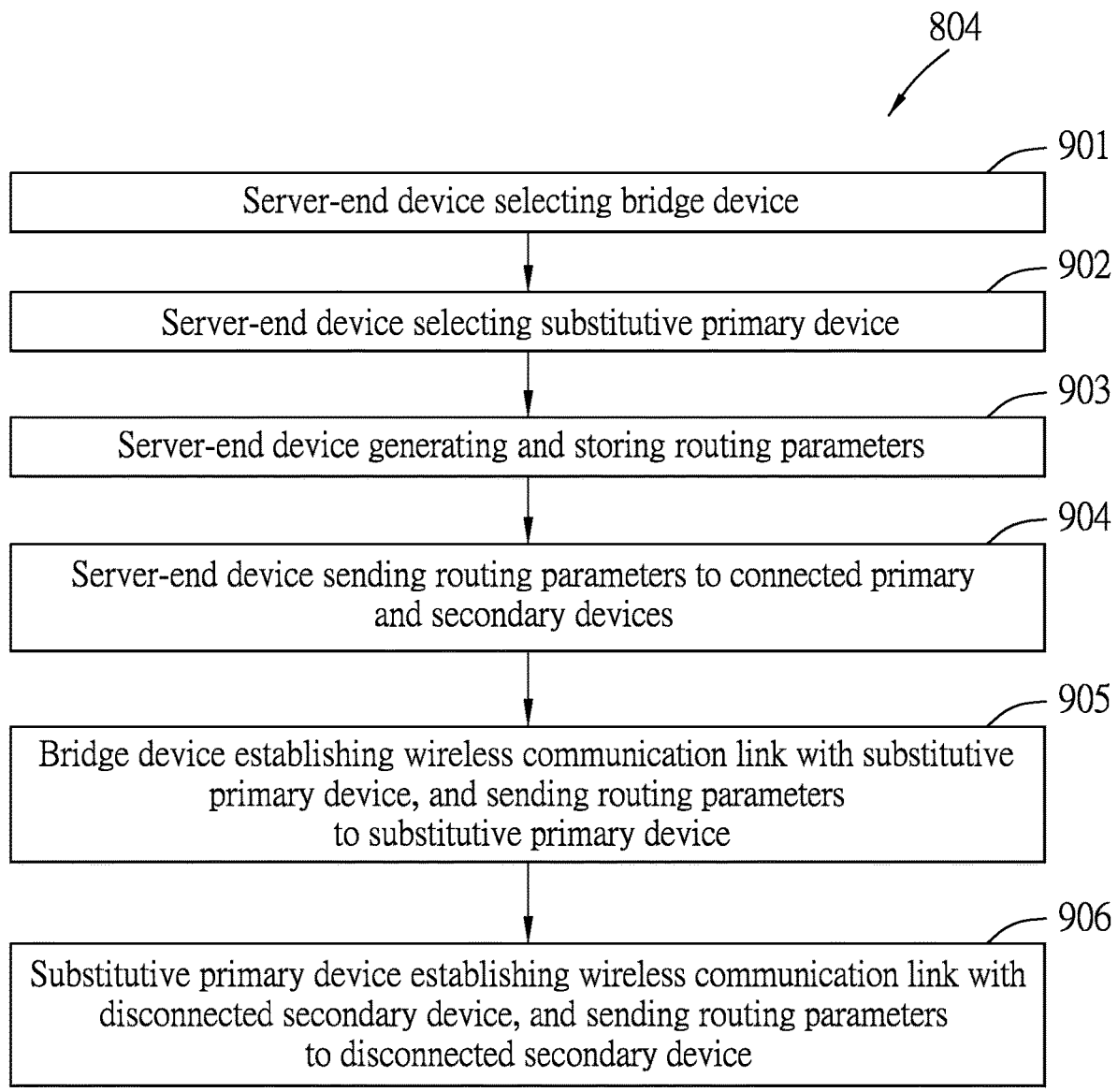
FIG. 9 is a flow chart that exemplarily illustrates a first recovery procedure according to an embodiment of the disclosure.

In Step 804, a first recovery procedure is performed. FIG. 9 exemplarily illustrates the first recovery procedure according to an embodiment of the disclosure. As shown in FIG. 9, the first recovery procedure includes Steps 901-906.

Referring to FIG. 9, in Step 901, the server-end device 1 selects, based on the set of routing parameters stored in the server-end device 1 and from a group consisting of the plural primary devices 11 except the disconnected primary device and the plural secondary devices 12 except the at least one subject device of the disconnected primary device, one device to serve as a bridge device. According to an embodiment of the disclosure, the server-end device 1 may select, from the group, one device that has a physical location closest to the location of the disconnected primary device to serve as the bridge device, but the disclosure is not limited thereto.

In Step 902, the server-end device 1 selects, based on the set of routing parameters stored in the server-end device 1 and from the at least one subject device of the disconnected primary device, one secondary device 12 to serve as a substitutive primary device. When said at least one subject device includes plural secondary devices 12, each of the rest of said at least one subject device (excluding the substitutive primary device) serves as a disconnected secondary device. According to some embodiments, when said at least one subject device includes plural secondary devices 12, the substitutive primary device may be selected based on physical locations of the subject devices and/or communication quality information related to the subject devices (e.g., the communication quality information indicated in the reporting message and/or the status messages that the disconnected primary device has sent to the server-end device 1 previously).

In Step 903, the server-end device 1 generates a new set of routing parameters based on the set of routing parameters stored in the server-end device 1, and stores the new set of routing parameters to replace the set of routing parameters that was originally stored in the server-end device 1 (referred to as "original set of routing parameters" hereinafter). Specifically, the new set of routing parameters indicates a wireless communication link between the substitutive primary device and the bridge device, and every wireless communication link that was indicated in the original set of routing parameters and that is not connected to any subject device of the disconnected primary device. When there exists at least one disconnected secondary device, the new set of routing parameters further indicates, for each of the disconnected secondary device(s), a wireless communication link between the substitutive primary device and the disconnected secondary device. In this way, the new set of routing parameters specifies at least one transmission route each of which is related to a respective one of the at least one subject device of the disconnected primary device, and each of which passes through the substitutive primary device and the bridge device.

In Step 904, the server-end device 1 sends the new set of routing parameters to each primary device 11 that is not the disconnected primary device, and to each secondary device 12 that is not the subject device of the disconnected primary device.

Figure 10:
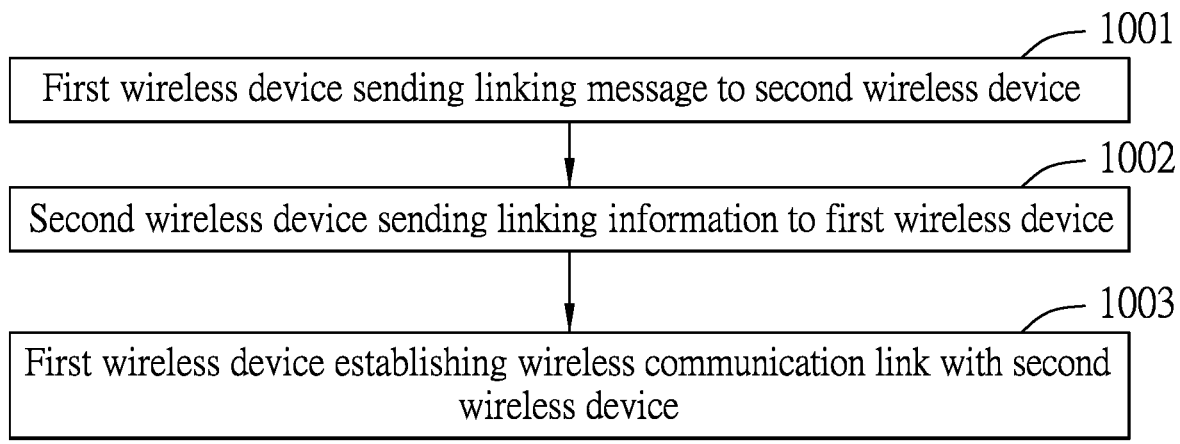
FIG. 10 is a flow chart that exemplarily illustrates a link establishment procedure according to an embodiment of the disclosure.

In Step 905, in response to receiving the new set of routing parameters, the bridge device establishes a wireless communication link between the bridge device and the substitutive primary device based on the new set of routing parameters, and sends the new set of routing parameters to the substitutive primary device through the wireless communication link thus established, wherein said wireless communication link is established by using the link establishment procedure as shown in FIG. 10 that will be quickly described below.

FIG. 10 illustrates a link establishment procedure that may be initiated by a first wireless device in order to establish a wireless communication link between the first wireless device and a second wireless device according to an embodiment of the disclosure. The link establishment procedure as shown in FIG. 10 includes Steps 1001-1003. In Step 1001, the first wireless device sends, to the second wireless device, a linking message that indicates the device identifier of the second wireless device. In Step 1002, the second wireless device sends linking information to the first wireless device in response to receiving the linking message which indicates its device identifier, wherein the linking information indicates the network address of the second wireless device. Then, in Step 1003, the first wireless device establishes, in response to receiving the linking information, a wireless communication link between the first and second wireless devices using the network address indicated in the linking information.

It is noted that, for the link establishment procedure used in Step 905, the bridge device and the substitutive primary device respectively act as the first wireless device and the second wireless device.

Returning back to FIG. 9, in Step 906, in response to receiving the new set of routing parameters, the substitutive primary device, for each disconnected secondary device, establishes a wireless communication link between the substitutive primary device and the disconnected secondary device based on the new set of routing parameters (e.g., according to the link establishment procedure described above with the substitutive primary device and the disconnected secondary device respectively acting as the first wireless device and the second wireless device), and sends the new set of routing parameters to the disconnected secondary device through the wireless communication link thus established.

Step 906 may be skipped when the at least one subject device of the disconnected primary device includes only one secondary device, in which case there is no disconnected secondary device.

Turning back to FIG. 8, in Step 805, the server-end device 1 determines, for each assistant device which is a subject device of the primary device 11 and based on the status message received from the primary device 11, whether the assistant device is a disconnected assistant device by determining whether the assistant device is in connection with the primary device 11 (that is, whether the primary device 11 is able to communicate with the assistant device through the wireless communication link between the primary device 11 and the assistant device). The assistant device is determined as a disconnected assistant device when the assistant device is not in connection with the primary device 11. When there exists any disconnected assistant device, the process goes to Step 808; otherwise, the process goes to step 806. It is noted that the procedure from step 808 to step 813 is to be performed with respect to each disconnected assistant device.

In Step 806, the server-end device 1 determines, for each subject device of the primary device 11 that is not an assistant device (which may be a tail device or a branch device) and based on the status message received from the primary device 11, whether the subject device is a missing device by determining whether the subject device is in connection with the primary device 11 (that is, whether the primary device 11 is able to communicate with the subject device through the transmission route that is specified in the set of routing parameters stored in the server-end device 1 and that is related to the subject device). The subject device is determined as a missing device when the subject device is not in connection with the primary device 11.

If any missing device is determined in Step 806, in Step 807, the server-end device 1 initiates a second recovery procedure with respect to each missing device that is determined in Step 806. If no missing device is determined in Step 806, Step 807 is skipped.

Figure 11:
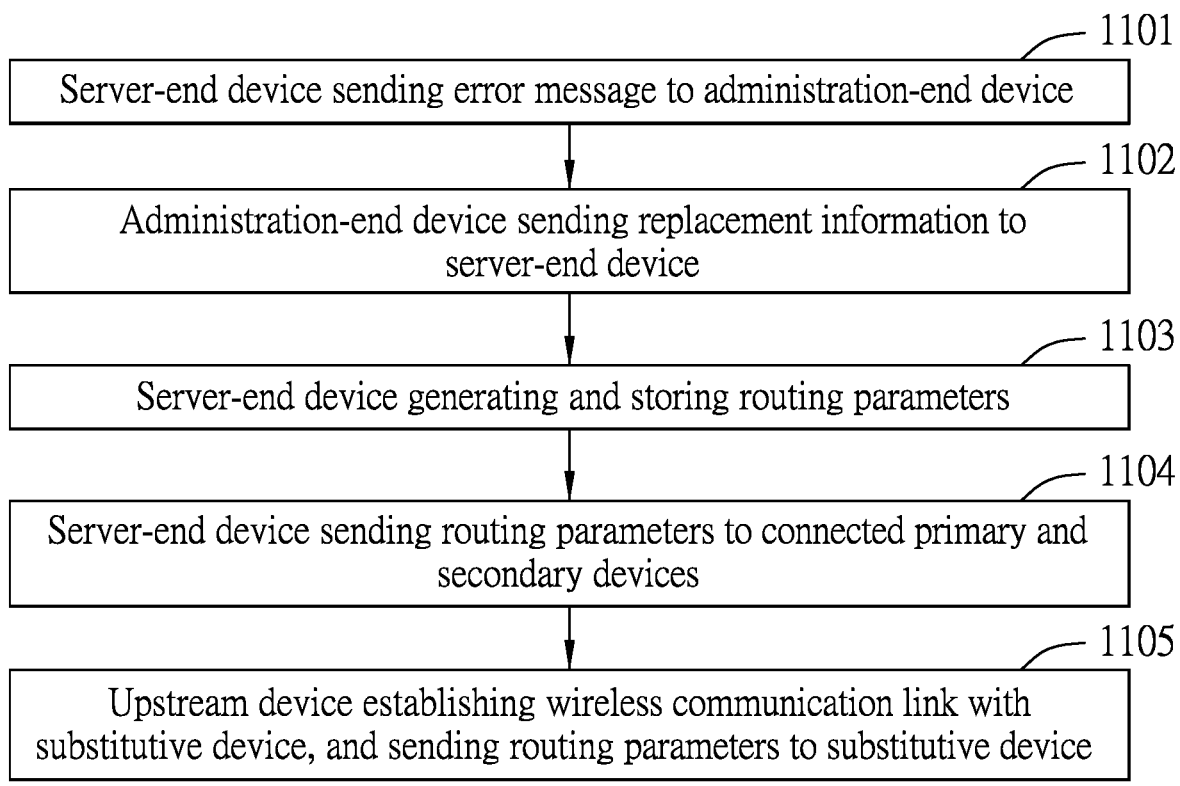
FIG. 11 is a flow chart that exemplarily illustrates a second recovery procedure according to an embodiment of the disclosure.

FIG. 11 exemplarily illustrates the second recovery procedure according to an embodiment of the disclosure. As shown in FIG. 11, the second recovery procedure includes Steps 1101-1105.

Referring to FIG. 11, in Step 1101, the server-end device 1 sends to the administration-end device 2 an error message that indicates the device identifier and the physical location of the missing device.

In Step 1102, the administration-end device 2 sends to the server-end device 1, in response to receiving the error message from the server-end device 1, replacement information that indicates the device identifier of the missing device, a device identifier of a substitutive device, a physical location of the substitutive device and a network address (e.g., a network path identifier assigned by the administration-end device 2) of the substitutive device. According to an embodiment of the disclosure, the substitutive device may be another wireless device that is predetermined or prearranged and is connected to the apparatus 20 which the missing device is connected with. According to another embodiment of the disclosure, the substitutive device may be the missing device itself when the replacement information is sent by the administration-end device 2 after a failure of the missing device has been resolved.

In Step 1103, the server-end device 1 generates, in response to receiving the replacement information, a new set of routing parameters based on the set of routing parameters stored in the server-end device 1 (i.e., the original set of routing parameters) by replacing the missing device with the substitutive device (that is, information related to the missing device including the device identifier, the network address and a physical location of the missing device is replaced by information related to the substitutive device including the device identifier, the network address and a physical location of the substitutive device), and stores the new set of routing parameters to replace the original set of routing parameters.

In Step 1104, the server-end device 1 sends the new set of routing parameters to each of the at least one primary device 11, and to each of the plural secondary devices 12 except the missing device.

In Step 1105, in response to receiving the new set of routing parameters, the upstream device (which may be a primary device 11 or an assistant device depending on whether the missing device is a branch device or a tail device) of the missing device establishes a wireless communication link between the upstream device and the substitutive device based on the new set of routing parameters (e.g., according to the link establishment procedure described above with the upstream device and the substitutive device respectively acting as the first wireless device and the second wireless device), and sends the new set of routing parameters to the substitutive device through the wireless communication link thus established.

Returning back to FIG. 8, in Step 808 which is performed when a disconnected assistant device is determined in Step 805, the server-end device 1 instructs the primary device 11 (i.e., the dominating device for the disconnected assistant device) to, for each of at least one subject tail device that was linked to the disconnected assistant device as specified in the set of routing parameters stored in the server-end device 1, send a contact signal to the subject tail device, in order for the subject tail device to send, to the primary device 11, a response signal that is to be forwarded to the server-end device 1. The contact signal indicates the device identifier of the subject tail device. The response signal indicates the device identifier and the network address of the subject tail device.

In Step 809, the server-end device 1 determines whether a number of the response signal(s) received through the primary device 11 exceeds a threshold. If so, the process goes to Step 810; otherwise, the process goes to Step 812. According to an embodiment of the disclosure, the threshold may be a number that is half of the number of the subject tail device(s) of the disconnected assistant device, but the disclosure is not limited thereto.

Figure 12:
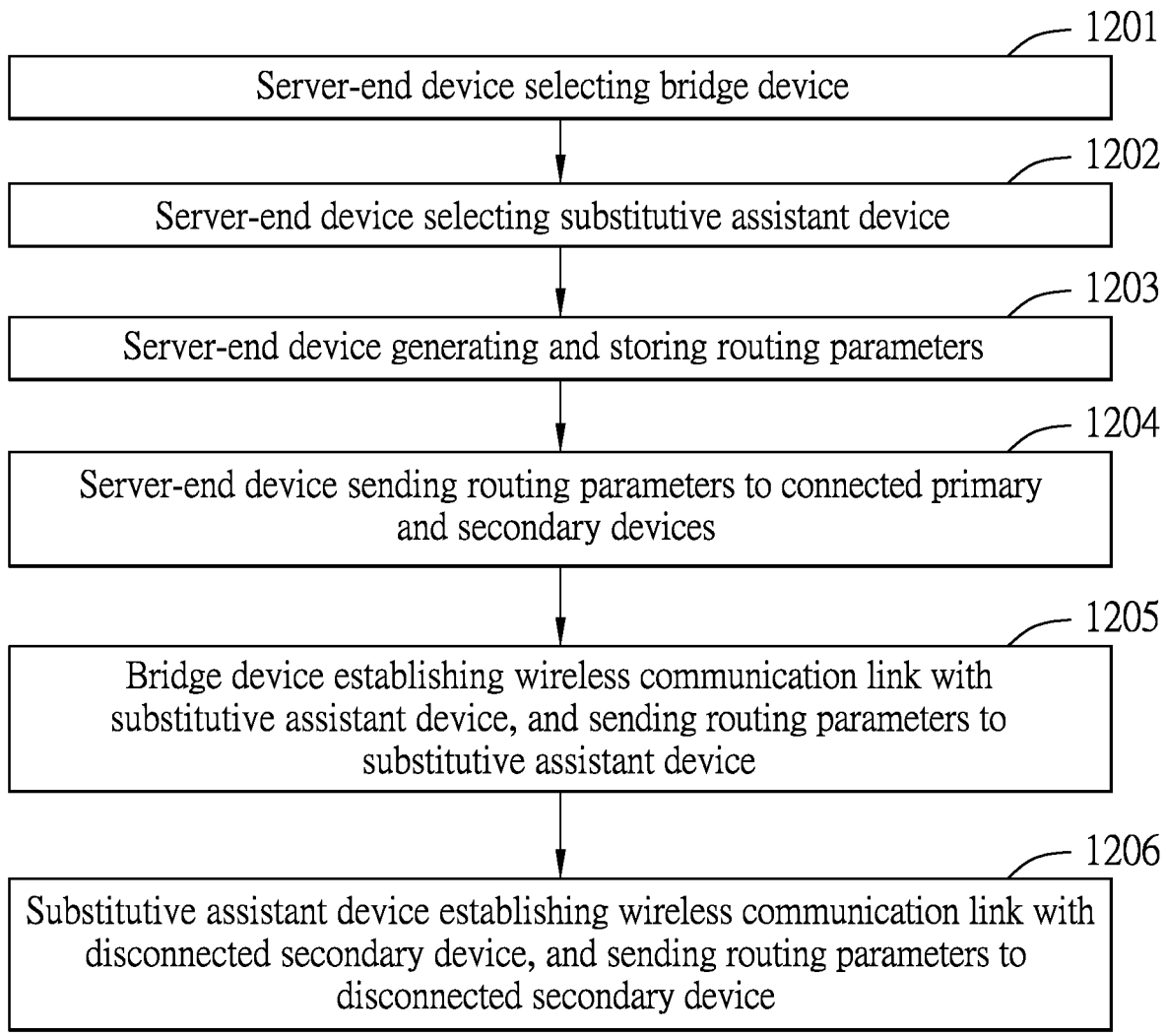
FIG. 12 is a flow chart that exemplarily illustrates a third recovery procedure according to an embodiment of the disclosure.

In Step 810, a third recovery procedure is performed. FIG. 11 exemplarily illustrates the third recovery procedure according to an embodiment of the disclosure. As shown in FIG. 12, the third recovery procedure includes Steps 1201-1206.

Referring to FIG. 12, in Step 1201, the server-end device 1 selects, based on the set of routing parameters stored in the server-end device 1 and from a group consisting of the at least one primary device 11 and the plural secondary devices 12 except the disconnected assistant device and the subject tail device(s) of the disconnected assistant device, one device to serve as a bridge device. According to an embodiment of the disclosure, the server-end device 1 may select, from the group, one device that has a physical location closest to the location of the disconnected assistant device to serve as the bridge device, but the disclosure is not limited thereto.

In Step 1202, the server-end device 1 selects, based on the set of routing parameters stored in the server-end device 1 and from at least one of the at least one subject tail device of the disconnected assistant device that has each sent the response signal (said at least one of the at least one subject tail device is referred to as functional tail device(s)), one secondary device 12 to serve as a substitutive assistant device. When the at least one subject tail device of the disconnected assistant device includes plural secondary devices 12, each of the rest of said at least one subject tail device (excluding the substitutive assistant device) serves as a disconnected secondary device. According to some embodiments, when the at least one subject tail device of the disconnected assistant device includes plural secondary devices 12, the substitutive assistant device may be selected based on physical locations of the subject tail devices and/or communication quality information related to the subject tail devices.

In Step 1203, the server-end device 1 generates a new set of routing parameters based on the set of routing parameters stored in the server-end device 1 (i.e., the original set of routing parameters), and stores the new set of routing parameters to replace the original set of routing parameters. Specifically, the new set of routing parameters indicates a wireless communication link between the substitutive assistant device and the bridge device corresponding to the disconnected assistant device, and every wireless communication link that was indicated in the original set of routing parameters and that is not connected to the disconnected assistant device. When there exists at least one disconnected secondary device corresponding to the disconnected assistant device, the new set of routing parameters further indicates, for each of the disconnected secondary device(s), a wireless communication link between the substitutive assistant device and the disconnected secondary device. In this way, the new set of routing parameters specifies at least one transmission route each of which is related to a respective one of the at least one subject tail device of the disconnected assistant device and each of which passes through the substitutive assistant device and the bridge device.

In Step 1204, the server-end device 1 sends the new set of routing parameters to each of the at least one primary device 11, and to each of the plural secondary devices 12 except the disconnected assistant device and the subject tail device(s) of the disconnected assistant device.

In Step 1205, in response to receiving the new set of routing parameters, the bridge device corresponding to the disconnected assistant device establishes a wireless communication link between the bridge device and the substitutive assistant device based on the new set of routing parameters (e.g., according to the link establishment procedure described above with the bridge device and the substitutive assistant device respectively acting as the first wireless device and the second wireless device), and sends the new set of routing parameters to the substitutive assistant device through the wireless communication link thus established.

In Step 1206, in response to receiving the new set of routing parameters, the substitutive assistant device corresponding to the disconnected assistant device, for each disconnected secondary device corresponding to the disconnected assistant device, establishes a wireless communication link between the substitutive assistant device and the disconnected secondary device based on the new set of routing parameters (e.g., according to the link establishment procedure described above with the substitutive assistant device and the disconnected secondary device respectively acting as the first wireless device and the second wireless device), and sends the new set of routing parameters to the disconnected secondary device through the wireless communication link thus established.

Step 1206 may be skipped when the at least one subject tail device of the disconnected assistant device includes only one secondary device, in which case there is no disconnected secondary device.

Then, returning back to FIG. 8, in Step 811, if the server-end device 1 fails to receive the response signal from every subject tail device of the disconnected assistant device, the server-end device 1 determines that each of at least one of said at least one subject tail device, a response signal sent from which is not received, is a missing device, and initiates the second recovery procedure (described above in relation with FIG. 11) for each missing device. Step 811 is skipped when the response signal from every subject tail device is received.

On the other hand, in Step 812 which is performed when the server-end device 1 determines that the number of the response signal(s) received through the primary device 11 does not exceed the threshold, the server-end device 1 determines that the disconnected assistant device is a missing device, and initiates the second recovery procedure with respect to the disconnected assistant device.

Then, in Step 813, the server-end device 1 determines that each of at least one of said at least one subject tail device, a response signal sent from which is not received, is a missing device, and initiates the second recovery procedure with respect to each of said at least one of said at least one subject tail device that is a missing device.

The disclosed method is beneficial in that the network topology thus established is more suitable from the administrator's point of view in comparison to the prior art, and therefore reduces maintenance and management costs. In addition, the automatic recovery and failure notification functionalities provided by the disclosed method further reduce the effort and cost required to maintain the device network of the plurality of wireless devices that has been constructed to monitor the plurality of apparatus.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for monitoring plural apparatus, the method to be implemented by a system which includes a server-end device, an administration-end device that is in communication with the server-end device, at least one primary device that is adapted to communicate with the server-end device, and plural secondary devices that are adapted to communicate with the at least one primary device and that are respectively connected with the plural apparatus, the at least one primary device and the plural secondary devices being each a wireless device having a device identifier, the method comprising steps of:
   A) by the server-end device after receiving a connection request from the administration-end device, establishing at least one primary wireless communication link respectively between the server-end device and the at least one primary device;
   B) by the administration-end device, for each of the at least one primary device, determining subset information which indicates a subset of the plural secondary devices that includes at least one secondary device which is to communicate with the server-end device through the primary device, the primary device serving as a dominating device for the at least one secondary device, each of the at least one secondary device serving as a subject device for the primary device;
   C) by each of the at least one primary device according to the subset information determined by the administration-end device, establishing at least one first temporary wireless communication link respectively between the primary device and the at least one subject device of the primary device;
   D) by the server-end device in response to receiving an assistant-setting request from the administration-end device, designating at least one of the plural secondary devices as at least one assistant device based on the assistant-setting request;
   E) by the server-end device after step D), establishing a network topology with respect to the at least one primary device and the plural secondary devices, wherein each of the plural secondary devices serves as one of: one of the at least one assistant device; a tail device that is to be directly linked to one of the at least one assistant device; and a branch device that is to be directly linked to the dominating device of the secondary device;
   F) by the server-end device, generating and storing a set of routing parameters that corresponds to the network topology thus established and that specifies plural transmission routes respectively related to the plural secondary devices, each of the transmission routes being between the respective one of the secondary devices and the dominating device of the respective one of the secondary devices;
   G) by the server-end device, sending the set of routing parameters thus generated to the at least one primary device and to the plural secondary devices, in order to construct, based on the set of routing parameters, a device network composed of the at least one primary device and the plural secondary devices in accordance with the network topology thus established; and
   H) by each of the plural secondary device after step G), receiving a working report from the apparatus that is connected with the secondary device, and transmitting the working report to the dominating device of the secondary device along the transmission route that corresponds to the secondary device, in order for the dominating device to forward the working report to the server-end device, the working report indicating an apparatus identifier of the apparatus and a working state of the apparatus.

2. The method of claim 1, wherein step A) includes sub-steps of:
   A-1) for each of the at least one primary device, receiving primary connection information from the primary device, the primary connection information indicating the device identifier of the primary device, a physical location of the primary device and a network address of the primary device; and
   A-2) in response to receiving the connection request, for each of the at least one primary device, establishing the primary wireless communication link between the server-end device and the primary device based on the connection request and the primary connection information received from the primary device.

3. The method of claim 1, wherein step C) includes following sub-steps that are to be performed by each of the at least one primary device:
   C-1) for each of the at least one subject device of the primary device, receiving secondary connection information from the subject device, the secondary connection information indicating the device identifier of the subject device, a physical location of the subject device, a network address of the subject device, and a number of data packets that the subject device has previously sent to the primary device; and C-2) based on the subset information determined by the administration-end device, for each of the at least one subject device of the primary device, establishing the first temporary wireless communication link between the primary device and the subject device based on the secondary connection information received from the subject device.

4. The method of claim 1, wherein:

step C) further includes measuring communication quality of the at least one first temporary wireless communication link that has been established;

the method further comprising, prior to step E), steps of:

I) by the server-end device, for each of the at least one assistant device, sending a measurement signal to the assistant device in order to initiate establishment of at least one second temporary wireless communication link respectively between the assistant device and at least another one of the at least one subject device of the dominating device of the assistant device;

J) by each of the at least one assistant device in response to receiving the measurement signal, establishing the at least one second temporary wireless communication link respectively between the assistant device and the at least another one of the at least one subject device of the dominating device of the assistant device, measuring communication quality of said at least one second temporary wireless communication link, and sending, to the dominating device of the assistant device, a link message that indicates, for each of said at least one second temporary wireless communication link, the communication quality of the second temporary wireless communication link thus measured; and K) by each of the at least one primary device, sending, to the server-end device, a reporting message that indicates, for each link among the at least one first temporary wireless communication link that was established by the primary device and any second temporary wireless communication link that is indicated in any link message the primary device has received, the communication quality of the link, the reporting message further indicating, for each device among the primary device and the at least one subject device of the primary device, the device identifier of the device and a physical location of the device; and step E) is to establish the network topology based on the reporting message(s) received from the at least one primary device.

5. The method of claim 1, the method further comprising following steps that are to be performed with respect to each of the at least one primary device:

I) by the server-end device, determining whether a status message is received from the primary device within a predetermined time period, the status message indicating, for each of the at least one subject device of the primary device, whether the transmission route related to the subject device is functional; and J) by the server-end device when it is determined that the status message is not received from the primary device within the predetermined time period, and when the at least one primary device includes plural primary devices, determining that the primary device is a disconnected primary device;

selecting, based on the set of routing parameters and from a group consisting of the plural primary devices except the disconnected primary device and the plural secondary devices except the at least one subject device of the disconnected primary device, one device to serve as a bridge device;

selecting, based on the set of routing parameters and from the at least one subject device of the disconnected primary device, one secondary device to serve as a substitutive primary device, each of the rest of said at least one subject device serving as a disconnected secondary device when said at least one subject device includes plural secondary devices; and generating a new set of routing parameters based on the set of routing parameters stored in the server-end device, and storing the new set of routing parameters thus generated to replace the set of routing parameters that is originally stored, the new set of routing parameters specifying at least one transmission route respectively related to the at least one subject device of the disconnected primary device, each of the at least one transmission route passing through the substitutive primary device and the bridge device.

6. The method of claim 5, the method further comprising, subsequent to step J), following steps that are to be performed with respect to each of the disconnected primary device(s):

K) by the server-end device, sending the new set of routing parameters to each of the plural primary devices except the disconnected primary device and each of the plural secondary devices except the at least one subject device of the disconnected primary device;

L) by the bridge device corresponding to the disconnected primary device in response to receiving the new set of routing parameters, establishing, based on the new set of routing parameters, a wireless communication link between said bridge device and the substitutive primary device that corresponds to the disconnected primary device, and sending the new set of routing parameters to said substitutive primary device; and M) when the at least one subject device of the disconnected primary device includes at least one disconnected secondary device, by the substitutive primary device corresponding to the disconnected primary device in response to receiving the new set of routing parameters, for each of the at least one disconnected secondary device, establishing a wireless communication link between said substitutive primary device and the disconnected secondary device based on the new set of routing parameters, and sending the new set of routing parameters to the disconnected secondary device.

7. The method of claim 6, wherein:

in step L), the bridge device is to establish the wireless communication link between the bridge device and the substitutive primary device by sending, based on the new set of routing parameters and to the substitutive primary device, a linking message that indicates the device identifier of the substitutive primary device, in order for the substitutive primary device to send to the bridge device, in response to receiving the linking message, linking information that indicates the network address of the substitutive primary device, and establishing the wireless communication link between the bridge device and the substitutive primary device using the network address indicated in the linking information received from the substitutive primary device; and in step M), the substitutive primary device is to establish the wireless communication link between the substitutive primary device and the disconnected secondary device by sending, based on the new set of routing parameters and to the disconnected secondary device, a linking message that indicates the device identifier of the disconnected secondary device, in order for the disconnected secondary device to send to the substitutive primary device, in response to receiving said linking message, linking information that indicates the network address of the disconnected secondary device, and establishing the wireless communication link between the substitutive primary device and the disconnected secondary using the network address indicated in the linking information received from the disconnected secondary device.

8. The method of claim 5, further comprising following step that is to be performed with respect to each of the at least one primary device, the status message from which is determined in step I) as being received within the predetermined time period:

K) by the server-end device, for each of the at least one subject device of the primary device that is not one of the at least one assistant device, determining whether the subject device is in connection with the primary device based on the status message received from the primary device; and when it is determined that the subject device is not in connection with the primary device, determining that the subject device is a missing device; and the method further comprising following steps that are to be performed when a missing device is determined in step K);

L) by the server-end device, sending, to the administration-end device, an error message that indicates the device identifier and the physical location of the missing device;

M) by the administration-end device in response to receiving the error message, sending, to the server-end device, replacement information that indicates the device identifier of the missing device, a device identifier of a substitutive device, a physical location of the substitutive device and a network address of the substitutive device, the substitutive device being a wireless device; and N) by the server-end device in response to receiving the replacement information, generating and storing a new set of routing parameters based on the set of routing parameters stored in the server-end device by replacing the missing device with the substitutive device.

9. The method of claim 8, the method further comprising following steps that are to be performed subsequent to step N) when a missing device is determined in step K):

O) by the server-end device, sending the new set of routing parameters generated in step N) to the at least one primary device and the plural secondary devices except the missing device;

P) by one device among the at least one primary device and the plural secondary devices that once established a wireless communication link between the one device and the missing device, sending, based on said new set of routing parameters and in response to receiving said new set of routing parameters, to the substitutive device that corresponds to the missing device, a linking message that indicates the device identifier of said substitutive device;

Q) by the substitutive device corresponding to the missing device, sending, in response to receiving the linking message, to the one device, linking information indicating the network address of the substitutive device; and R) by the one device in response to receiving the linking information, establishing a wireless communication link between the one device and the substitutive device by using the network address indicated in the linking information, and sending said new set of routing parameters to the substitutive device.

10. The method of claim 5, further comprising following step that is to be performed with respect to each of the at least one primary device, the status message from which is determined in step I) as being received within the predetermined time period:

K) by the server-end device, for each of at least one assistant device that is a subject device of the primary device, determining whether the assistant device is a disconnected assistant device by determining whether the assistant device is in connection with the primary device based on the status message received from the primary device;

the method further comprising following steps that are to be performed when a disconnected assistant device is determined in step K);

L) by the server-end device, instructing the primary device to, for each of at least one tail device that was linked to the disconnected assistant device as specified in the set of routing parameters stored in the server-end device, sending a contact signal to the tail device, in order for the tail device to send, to the primary device, a response signal that is to be forwarded to the server-end device, the contact signal indicating the device identifier of the tail device, the response signal indicating the device identifier and the network address of the tail device;

M) by the server-end device, determining whether a number of the response signal received through the primary device exceeds a threshold; and N) when it is determined that the number of the response signal(s) exceeds the threshold, by the server-end device, selecting, based on the set of routing parameters stored in the server-end device and from a group consisting of the at least one primary device and the plural secondary devices except the disconnected assistant device and except the at least one tail device that corresponds to the disconnected assistant device, one device to serve as a bridge device;

selecting, based on the set of routing parameters stored in the server-end device and from the at least one tail device that corresponds to the disconnected assistant device, one secondary device to serve as a substitutive assistant device, each of the rest of said at least one tail device serving as a disconnected secondary device when said at least one tail device includes plural secondary devices; and generating a new set of routing parameters based on the set of routing parameters stored in the server-end device, and storing the new set of routing parameters thus generated to replace the set of routing parameters that is originally stored, said new set of routing parameters specifying at least one transmission route respectively related to the at least one tail device that corresponds to the disconnected assistant device, each of said at least one transmission route passing through the substitutive assistant device and the bridge device that corresponds to the disconnected assistant device.

11. The method of claim 10, the method further comprising following steps that are to be performed subsequent to step N) when a disconnected assistant device is determined in step K):

O) by the server-end device, sending the new set of routing parameters generated in step N) to the at least one primary device and the plural secondary devices except the disconnected assistant device and except the at least one tail device that corresponds to the disconnected assistant device;

S) by the bridge device corresponding to the disconnected assistant device in response to receiving said new set of routing parameters, establishing, based on said new set of routing parameters, a wireless communication link between said bridge device and the substitutive assistant device that corresponds to the disconnected assistant device, and sending said new set of routing parameters to the substitutive assistant device through the wireless communication link thus established;

T) when the at least one tail device corresponding to the disconnected assistant device includes at least one disconnected secondary device, by the substitutive assistant device corresponding to the disconnected assistant device in response to receiving said new set of routing parameters, for each of said at least one disconnected secondary device, establishing a wireless communication link between the substitutive assistant device and the disconnected secondary device based on said new set of routing parameters, and sending said new set of routing parameters to the disconnected secondary device through the wireless communication link thus established.

12. The method of claim 10, further comprising following steps that are to be performed when a disconnected assistant device is determined in step K) and when it is determined in step M) that the number of the response signal (s) received through the primary device does not exceed the threshold:

O) by the server-end device, sending, to the administration-end device, an error message that indicates the device identifier and the physical location of the disconnected assistant device;

P) by the administration-end device in response to receiving the error message, sending, to the server-end device, replacement information that indicates the device identifier of the disconnected assistant device, a device identifier of a substitutive device, a physical location of the substitutive device and a network address of the substitutive device, the substitutive device being a wireless device; and Q) by the server-end device in response to receiving the replacement information, generating and storing a new set of routing parameters based on the set of routing parameters stored in the server-end device by replacing the disconnected assistant device with the substitutive device.

13. The method of claim 12, the method further comprising following steps that are to be performed subsequent to step Q) when a disconnected assistant device is determined in step K):

R) by the server-end device, sending the new set of routing parameters generated in step Q) to the at least one primary device and the plural secondary devices except the disconnected assistant device and except the at least one tail device that corresponds to the disconnected assistant device;

S) by the dominating device of the disconnected assistant device in response to receiving said new set of routing parameters, sending, based on said new set of routing parameters, to the substitutive device that corresponds to the disconnected assistant device, a linking message that indicates the device identifier of said substitutive device;

T) by the substitutive device corresponding to the disconnected assistant device in response to receiving the linking message, sending to the dominating device of the disconnected assistant device, linking information that indicates the network address of the substitutive device; and U) by the dominating device of the disconnected assistant device in response to receiving the linking information, establishing a wireless communication link between the dominating device and the substitutive device by using the network address indicated in the linking information, and sending said new set of routing parameters to the substitutive device.

14. The method of claim 10, the method further comprising following step that is to be performed subsequent to step N) when a disconnected assistant device is determined in step K), when it is determined in step M) that the number of the response signal(s) exceeds the threshold, and when the response signal is not received from each of the at least one tail device corresponding to the disconnected assistant device:

O) by the server-end device, determining that each of at least one of the at least one tail device, the response signal sent from which is not received, is a missing device;

wherein the method further comprises following steps that are to be performed when a missing device is determined in step O):

P) by the server-end device, sending, to the administration-end device, an error message that indicates the device identifier and the physical location of the missing device;

Q) by the administration-end device in response to receiving the error message, sending, to the server-end device, replacement information that indicates the device identifier of the missing device, a device identifier of a substitutive device, a physical location of the substitutive device and a network address of the substitutive device, the substitutive device being a wireless device;

R) by the server-end device in response to receiving the replacement information, generating a new set of routing parameters based on the set of routing parameters stored in the server-end device by replacing the missing device with the substitutive device, and storing the new set of routing parameters thus generated to replace the set of routing parameters that is originally stored;

S) by the server-end device, sending the new set of routing parameters generated in step R) to the at least one primary device and the plural secondary devices except the missing device;

T) by the substitutive assistant device corresponding to the disconnected assistant device, establishing, in response to receiving said new set of routing parameters, a wireless communication link between the substitutive assistant device and the substitutive device based on said new set of routing parameters, and sending said new set of routing parameters to the substitutive device through the wireless communication link thus established.

* * * * *